(12) United States Patent
Niedzielski et al.

(10) Patent No.: US 12,093,150 B1
(45) Date of Patent: *Sep. 17, 2024

(54) SYSTEMS AND METHODS FOR ONLINE BRAND CONTINUITY

(71) Applicant: United Services Automobile Association (USAA), San Antonio, TX (US)

(72) Inventors: David M. Niedzielski, San Antonio, TX (US); Christopher S. Trost, San Antonio, TX (US); Roger Pena, Atascosa, TX (US); Tommy Lavelle, San Antonio, TX (US); Donald E. Clemons, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,993

(22) Filed: Jun. 21, 2023

Related U.S. Application Data

(63) Continuation of application No. 17/748,721, filed on May 19, 2022, now Pat. No. 11,687,421, which is a
(Continued)

(51) Int. Cl.
| | | |
|---|---|---|
| G06F 15/16 | (2006.01) |
| G06F 11/20 | (2006.01) |
| G06Q 30/02 | (2023.01) |
| H04L 67/10 | (2022.01) |
| H04L 67/1008 | (2022.01) |
| H04L 67/1021 | (2022.01) |
| H04L 67/1095 | (2022.01) |

(Continued)

(52) U.S. Cl.
CPC ......... *G06F 11/2023* (2013.01); *G06Q 30/02* (2013.01); *H04L 67/10* (2013.01); *H04L 67/1008* (2013.01); *H04L 67/1021* (2013.01); *H04L 67/1095* (2013.01); *H04L 69/40* (2013.01); *G06F 16/58* (2019.01); *G06F 16/954* (2019.01); *G06F 16/958* (2019.01); *G06F 2201/805* (2013.01); *G06F 2201/855* (2013.01); *H04L 61/4511* (2022.05); *H04L 67/1001* (2022.05); *H04L 67/104* (2013.01); *H04L 67/1097* (2013.01); *H04W 88/12* (2013.01)

(58) Field of Classification Search
CPC .... G06F 11/2023; G06F 16/958; G06F 16/58; G06F 16/954; G06F 2201/805; G06F 2201/855; G06Q 30/02; H04L 67/10; H04L 67/1008; H04L 67/1021; H04L 67/1095; H04L 69/40; H04L 61/4511; H04L 67/1001; H04L 67/104; H04L 67/1097; H04W 88/12
USPC ......................................................... 709/217
See application file for complete search history.

(56) References Cited

U.S. PATENT DOCUMENTS

| | | |
|---|---|---|
| 6,614,757 B1 | 9/2003 | Rochberger et al. |
| 6,816,891 B1 | 11/2004 | Vahalia et al. |
| (Continued) | | |

*Primary Examiner* — Alan S Chou
(74) *Attorney, Agent, or Firm* — Fletcher Yoder, P.C.

(57) ABSTRACT

The present disclosure provides a system and method for online brand continuity. Online brand continuity can include a number of Internet or intranet access points via which one or more network addresses can be advertised. A client can be provided with availability of a business image application via at least one of the Internet or intranet access points.

20 Claims, 3 Drawing Sheets

Related U.S. Application Data continuation of application No. 17/330,150, filed on May 25, 2021, now Pat. No. 11,347,602, which is a continuation of application No. 16/809,374, filed on Mar. 4, 2020, now Pat. No. 11,042,455, which is a continuation of application No. 15/954,394, filed on Apr. 16, 2018, now Pat. No. 10,606,717, which is a continuation of application No. 14/474,273, filed on Sep. 1, 2014, now Pat. No. 9,990,259, which is a continuation of application No. 12/046,155, filed on Mar. 11, 2008, now Pat. No. 8,825,792.

(51) Int. Cl.
*H04L 69/40* (2022.01)
*G06F 16/58* (2019.01)
*G06F 16/954* (2019.01)
*G06F 16/958* (2019.01)
*H04L 61/4511* (2022.01)
*H04L 67/1001* (2022.01)
*H04L 67/104* (2022.01)
*H04L 67/1097* (2022.01)
*H04W 88/12* (2009.01)

(56) References Cited

U.S. PATENT DOCUMENTS

| | | | |
|---|---|---|---|
| 6,824,055 B2 | 11/2004 | Tregoning et al. | |
| 6,824,774 B2 | 11/2004 | Anderson et al. | |
| 6,894,994 B1 | 5/2005 | Grob et al. | |
| 7,035,932 B1 | 4/2006 | Dowling | |
| 7,042,988 B2 | 5/2006 | Juitt et al. | |
| 7,210,147 B1 | 4/2007 | Hipp et al. | |
| 7,284,055 B1 | 10/2007 | Oehrke et al. | |
| 7,454,457 B1 | 11/2008 | Lowery et al. | |
| 7,529,254 B2 | 5/2009 | Tsuge et al. | |
| 7,555,287 B1 | 6/2009 | Heinonen et al. | |
| 7,626,094 B2 | 12/2009 | Burdett et al. | |
| 7,626,994 B2 | 12/2009 | Bennett | |
| 7,697,416 B2 | 4/2010 | Shand et al. | |
| 8,825,792 B1 | 9/2014 | Niedzielski et al. | |
| 10,606,717 B1 * | 3/2020 | Niedzielski | H04L 69/40 |
| 11,347,602 B1 | 5/2022 | Niedsielski et al. | |
| 2001/0047387 A1 | 11/2001 | Brockhurst | |
| 2002/0049778 A1 | 4/2002 | Bell et al. | |
| 2002/0157007 A1 | 10/2002 | Sashihara | |
| 2003/0105865 A1 | 6/2003 | McCanne et al. | |
| 2003/0172145 A1 | 9/2003 | Nguyen | |
| 2004/0261116 A1 | 12/2004 | Mckeown et al. | |
| 2005/0209744 A1 | 9/2005 | Ihbe et al. | |
| 2006/0034235 A1 | 2/2006 | Yamane | |
| 2006/0036761 A1 | 2/2006 | Amra et al. | |
| 2006/0092975 A1 | 5/2006 | Ansari et al. | |
| 2006/0104231 A1 | 5/2006 | Gidwani | |
| 2006/0179147 A1 | 8/2006 | Tran et al. | |
| 2006/0187854 A1 | 8/2006 | Booth et al. | |
| 2006/0193247 A1 | 8/2006 | Naseh et al. | |
| 2006/0193252 A1 | 8/2006 | Naseh et al. | |
| 2006/0195607 A1 | 8/2006 | Naseh et al. | |
| 2006/0251255 A1 | 11/2006 | Batta | |
| 2006/0268767 A1 | 11/2006 | Sato et al. | |
| 2006/0291421 A1 | 12/2006 | Park | |
| 2007/0047550 A1 | 3/2007 | Takayama | |
| 2007/0109991 A1 | 5/2007 | Bennett | |
| 2007/0153738 A1 | 7/2007 | Barker et al. | |
| 2007/0153739 A1 | 7/2007 | Zheng | |
| 2007/0156919 A1 | 7/2007 | Potti et al. | |
| 2007/0168336 A1 | 7/2007 | Ransil et al. | |
| 2007/0255916 A1 | 11/2007 | Hiraiwa et al. | |
| 2008/0019380 A1 | 1/2008 | Hirano et al. | |
| 2008/0049649 A1 | 2/2008 | Kozisek et al. | |
| 2008/0112362 A1 | 5/2008 | Korus | |
| 2008/0192696 A1 | 8/2008 | Sachs et al. | |
| 2008/0209258 A1 * | 8/2008 | Casale | H04L 41/00 714/E11.023 |
| 2008/0285541 A1 | 11/2008 | Van Der Merwe et al. | |
| 2009/0046614 A1 | 2/2009 | Lewis et al. | |
| 2009/0210513 A1 | 8/2009 | Boss et al. | |
| 2009/0222498 A1 | 9/2009 | Lu et al. | |
| 2009/0228676 A1 | 9/2009 | Naganuma et al. | |
| 2011/0153769 A1 | 6/2011 | Cha et al. | |
| 2011/0191305 A1 | 8/2011 | Nakamura et al. | |
| 2012/0072640 A1 | 3/2012 | Crawford et al. | |
| 2012/0150798 A1 | 6/2012 | Dawson et al. | |
| 2012/0212909 A1 | 8/2012 | Jeffery et al. | |
| 2012/0303912 A1 | 11/2012 | Calder et al. | |
| 2012/0317353 A1 | 12/2012 | Webman et al. | |
| 2013/0346366 A1 | 12/2013 | Ananthanarayanan et al. | |
| 2014/0181016 A1 | 6/2014 | Whitehead et al. | |
| 2015/0032695 A1 | 1/2015 | Tran et al. | |
| 2015/0142738 A1 | 5/2015 | Fujii et al. | |
| 2015/0186488 A1 | 7/2015 | Fischer et al. | |
| 2015/0213051 A1 | 7/2015 | Wang et al. | |
| 2015/0295881 A1 | 10/2015 | Anderson et al. | |
| 2016/0028806 A1 | 1/2016 | Wareing | |

\* cited by examiner

SYSTEMS AND METHODS FOR ONLINE BRAND CONTINUITY

CROSS REFERENCE TO RELATED APPLICATIONS

This application is a continuation application of U.S. patent application Ser. No. 17/748,721, entitled "Systems and Methods for Online Brand Continuity," filed May 19, 2022, which is a continuation application of U.S. patent application Ser. No. 17/330,150, entitled "Systems and Methods for Online Brand Continuity," filed May 25, 2021, which is a continuation application of U.S. patent application Ser. No. 16/809,374, entitled "Systems and Methods for Online Brand Continuity," filed Mar. 4, 2020, which is a continuation application of U.S. patent application Ser. No. 15/954,394, entitled "Systems and Methods for Online Brand Continuity," filed Apr. 16, 2018, which is a continuation application of U.S. patent application Ser. No. 14/474,273, entitled "Systems and Methods for Online Brand Continuity," filed Sep. 1, 2014, which is a continuation application of U.S. patent application Ser. No. 12/046,155, entitled "Systems and Methods for Online Brand Continuity," filed Mar. 11, 2008, all of which is hereby incorporated in its entirety.

BACKGROUND

A brand image is considered to be a powerful asset for many organizations. Organizations may allocate significant capital toward protecting their brand image in the form of advertising, market surveys and analysis, quality control measures, trademark protection, and other means. As an organization grows, it may tend to develop an online brand image, sometimes associated with a website or other online application. An online brand image for an organization may be as significant of an asset as a more traditional brand image, such as reputation for quality products.

One facet of an online brand image for an organization is availability or continuity of presence of the online application projecting the brand image. For example, an organization may wish to project such characteristics as strength, reliability, integrity, security, and others through persistent presence of an online application. An organization may desire to provide "always-on" online applications such that a client using the applications receives, or at least perceives, continuous service. Accordingly, much effort has been exerted in the areas of reliability, durability, and security of online applications, particularly with respect to data centers that host such online applications.

As continuity of online applications hosted in a data center may be critical to particular organizations, various efforts have been made to enhance the reliability of data centers. For example, some data centers are provided with physical reliability such as housing the data center in an inconspicuous location, providing restricted access to the data center, providing the data center with environmental isolation and control, and providing electrical power supply redundancy to the data center. Another element of reliability that has been added to data center design is to provide an organization with more than one physical data center, e.g., providing multiple data centers at different locations. Likewise, an online access point, such as an Internet or intranet connection, to a data center may fail, which could obviate certain measures taken to protect the functionality of a single data center.

Providing "redundant" or "backup" data centers may provide an organization with the ability to protect online application functionality against harmful factors that extend beyond the scope of the organization's control over a single data center. For example, a single data center may be vulnerable to physical failure, e.g., from terrorist activity, fire, earthquake, etc. A single data center may be vulnerable to electronic failure, e.g., "hacker" activity such as viruses, broadcast storms, denial of service attacks, and the like. A single data center may be vulnerable to electric and/or telecommunications failure of such a magnitude that the provided redundant systems internal to the data center are unable to mitigate the failure. Other failures reducing or eliminating the functionality of a single data center are possible. In such instances, having additional data centers at separate geographic locations may provide the organization with the ability to maintain data center functionality after the loss of a single data center or online access point.

SUMMARY

In one or more embodiments, a system for online brand continuity can include a first Internet access point via which a first specific network address is advertised for a brand image application. The system can also include a second Internet access point via which a second specific network address is advertised for the brand image application. The system can further include a third Internet access point via which a less-specific network address is advertised for the brand image application. The brand image application is available to a client via at least one of the first and second Internet access points when at least one of the first and second Internet access points meets particular criteria. The brand image application is at least partially available to the client via the third Internet access point when the first and second Internet access points fail to meet particular criteria.

According to one or more embodiments of the present disclosure, a method for online brand continuity can include advertising a first specific network address for a brand image application via a first Internet access point. The method can also include advertising a second specific network address for the brand image application via a second Internet access point. The method can further include advertising a less-specific network address for the brand image application via a third Internet access point. The method can include making the brand image application available to a client via at least one of the first and second Internet access points when at least one of the first and second Internet access points meets particular criteria. The method can include making the brand image application at least partially available to the client via the third Internet access point when the first and second Internet access points fail to meet particular criteria.

One or more embodiments of the present disclosure include a computing device readable medium having instructions stored thereon, which, when executed by a processor, cause a device to perform a method for online brand continuity, including advertising a first specific network address for a brand image application via a first Internet access point. The method includes advertising a second specific network address for the brand image application via a second Internet access point. The method also includes advertising a less-specific network address for the brand image application via a third Internet access point. The method further includes making the brand image application available to a client via at least one of the first and second Internet access points when at least one of the first and second Internet access points meet particular criteria.

The method includes making the brand image application at least partially available to the client via the third Internet access point when the first and second Internet access points fail to meet particular criteria.

In one or more embodiments, a system for online brand continuity includes a first Internet access point via which a specific network address is advertised for a brand image application. The system includes a second Internet access point via which a less-specific network address is advertised for the brand image application. The brand image application is available to a client via the first Internet access point when the specific network address is advertised via the first Internet access point. The system protects a brand image by providing availability of the brand image application to the client via the second Internet access point when the specific network address ceases to be advertised via the first Internet access point.

According to one or more embodiments of the present disclosure, a method for online brand continuity includes advertising a specific network address via a first Internet access point for brand image application. The method also includes advertising a less-specific network address via a second Internet access point for the brand image application. The method further includes providing availability of the brand image application to a client via the first Internet access point when the specific network address is advertised via the first Internet access point. The method includes protecting a brand image by providing availability of the brand image application to the client via the second Internet access point when the specific network address ceases to be advertised via the first Internet access point.

One or more embodiments of the present disclosure include a computing device readable medium having instructions stored thereon, which, when executed by a processor, cause a device to perform a method for online brand continuity, including advertising a specific network address via a first Internet access point for brand image application. The method also includes advertising a less-specific network address via a second Internet access point for the brand image application. The method further includes providing availability of the brand image application to a client via the first Internet access point when the specific network address is advertised via the first Internet access point. The method includes protecting a brand image by providing availability of the brand image application to the client via the second Internet access point when the specific network address ceases to be advertised via the first Internet access point.

In one or more embodiments of the present disclosure, a system for online brand continuity includes a first intranet access point via which a specific network address for a brand image application is advertised. The system includes a second intranet access point via which the specific network address for the brand image application is advertised. The system also includes a third intranet access point via which a less-specific network address for the brand image application is advertised. The system further includes a client having availability of the brand image application via at least one of the first and second intranet access points. The client has at least partial availability of the brand image application via the third intranet access point. The first, second, and third intranet access points, and the client are interconnected via an autonomous intranetwork using interior gateway protocol (IGP).

According to one or more embodiments of the present disclosure, a method for online brand continuity includes advertising a specific network address for a brand image application via a first intranet access point. The method includes advertising the specific network address for a brand image application via a second intranet access point. The method also includes advertising a less-specific network address for the brand image application via a third intranet access point. The method further includes providing availability of the brand image application to a client via at least one of the first and second intranet access points. The method includes providing at least partial availability of the brand image application to the client via the third intranet access point. The method includes interconnecting the first, second, and third intranet access points, and the client via an autonomous intranetwork using interior gateway protocol (IGP).

One or more embodiments of the present disclosure include a computing device readable medium having instructions stored thereon, which, when executed by a processor, cause a device to perform a method for online brand continuity, including advertising a specific network address for a brand image application via a first intranet access point. The method includes advertising the specific network address for the brand image application via a second intranet access point. The method also includes advertising a less-specific network address for the brand image application via a third intranet access point. The method further includes providing availability of the brand image application to a client via at least one of the first and second intranet access points. The method includes providing at least partial availability of the brand image application to the client via the third intranet access point. The method includes interconnecting the first, second, and third intranet access points, and the client via an autonomous intranetwork using interior gateway protocol (IGP).

DETAILED DESCRIPTION

Figure 1:
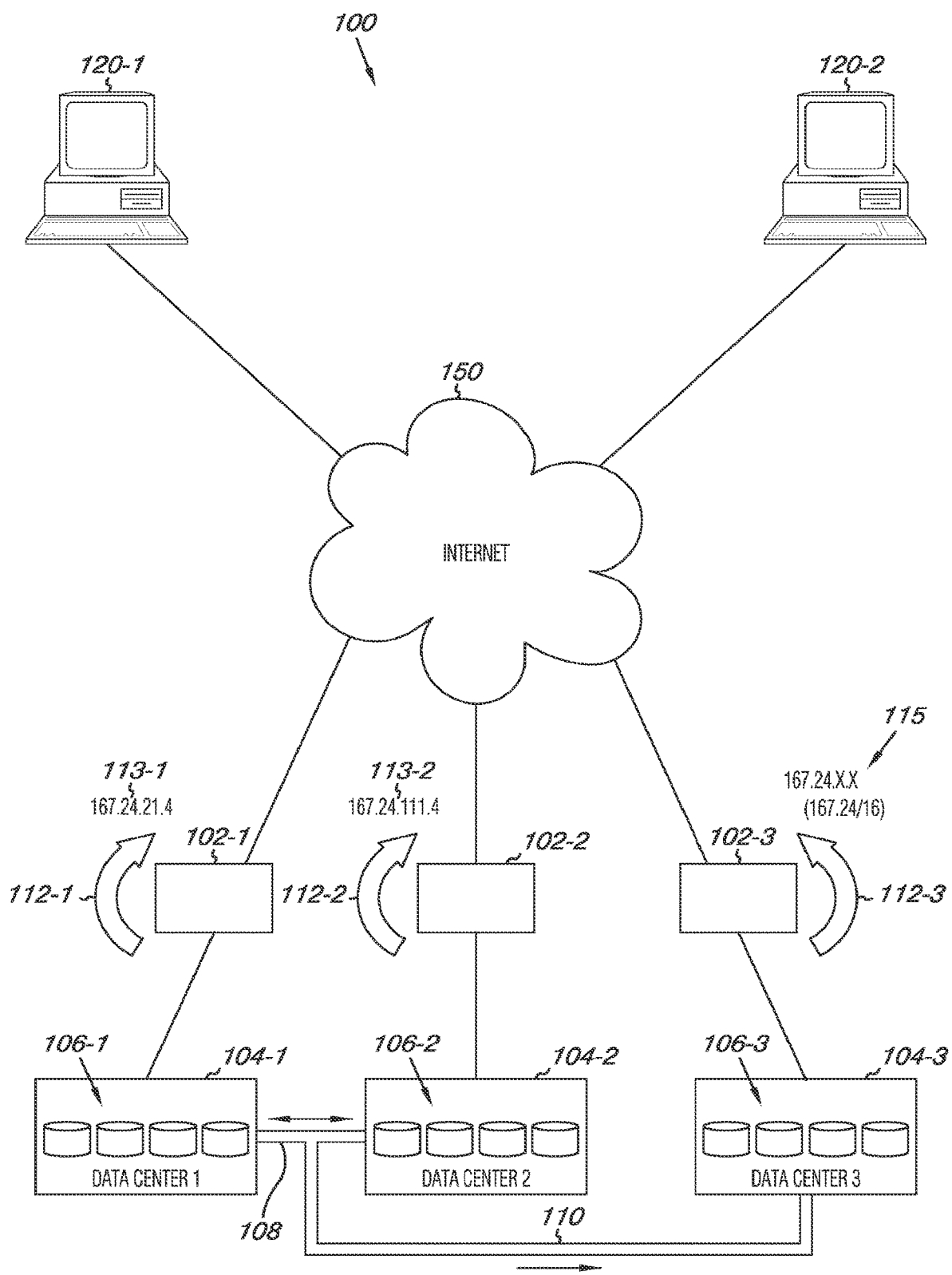
FIG. 1 illustrates a block diagram of a system for online brand continuity having three Internet access points according to one or more embodiments of the present disclosure.

The present disclosure provides a system and method for online brand continuity. Online brand continuity can include a number of Internet or intranet access points via which one or more network addresses can be advertised. A client can be provided with availability of a business image application via at least one of the Internet or intranet access points.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element in the drawing. Similar elements between different figures may be identified by the use of similar digits. For example, 102 may reference element "102" in FIG. 1, and a similar element may be referenced as 202 in FIG. 2.

As used herein, an access point can be a layer 1, e.g., physical layer, connection such as an Ethernet cable, a modem, a fiber optic cable, a USB cable, a synchronous optical network (SONET) connection, 802.11x wireless connections, T-carrier links, or other connections. As used herein, failure to meet particular criteria for an access point includes loss of a physical layer connection, e.g., a modem that is not working. Failure to meet particular criteria also includes loss of service via a physical layer access point. For example, if a computing device is connected to an Internet service provider (ISP) through an Ethernet cable connected to a modem, and the ISP ceases to provide service, then such an occurrence is referred to herein as failure to meet particular criteria, where the access point can refer to any of the Ethernet cable, modem, or other physical connection, regardless of whether the physical connections are otherwise functional. Likewise, an access point is considered to meet particular criteria if it is providing a network connection, e.g., to the Internet or intranet. The above examples of particular criteria are not provided as a limitation on particular criteria. For example, particular criteria can include inability to handle a given volume of traffic for an access point. Other criteria are possible.

That a network address can be advertised via an access point means that the advertisement touches or passes through the access point. That a network address can be advertised via an access point does not require that the advertisement originate or terminate at the access point.

As used herein, an autonomous intranet is a network or collection of networks under the control of an organization, e.g., the organization can have a common routing policy for the autonomous intranet. An autonomous network may or may not have a connection to the public Internet. As used herein, a website is a collection of one or more web pages that can be associated with a particular person or organization. For example, a website associated with the uniform resource locator (URL) http://www.uspto.gov is a website including a number of web pages, e.g. http://www.uspto.gov/patf/index.html, which may generally be regarded as the Patent and Trademark Office website, and can be managed by the USPTO or their designated agents.

As used herein, online applications or brand image applications include services such as websites, streaming media, executable program applications, file transfer protocol (FTP) applications, data storage, online business transactions such as banking, insurance, and the like, among other online applications. In one or more embodiments, brand image application data includes data associated with online applications such as files stored in databases, client profiles, client passwords, financial records, executable instructions for providing the online application, and other such data. That is, brand image application data itself, may not provide a brand image. However, brand image application data may be used to facilitate brand image applications, e.g., program instructions containing brand image application data can be executed to provide a website that presents a brand image. Partial availability of a brand image application can include full availability of certain portions of the brand image application.

Figure 2:
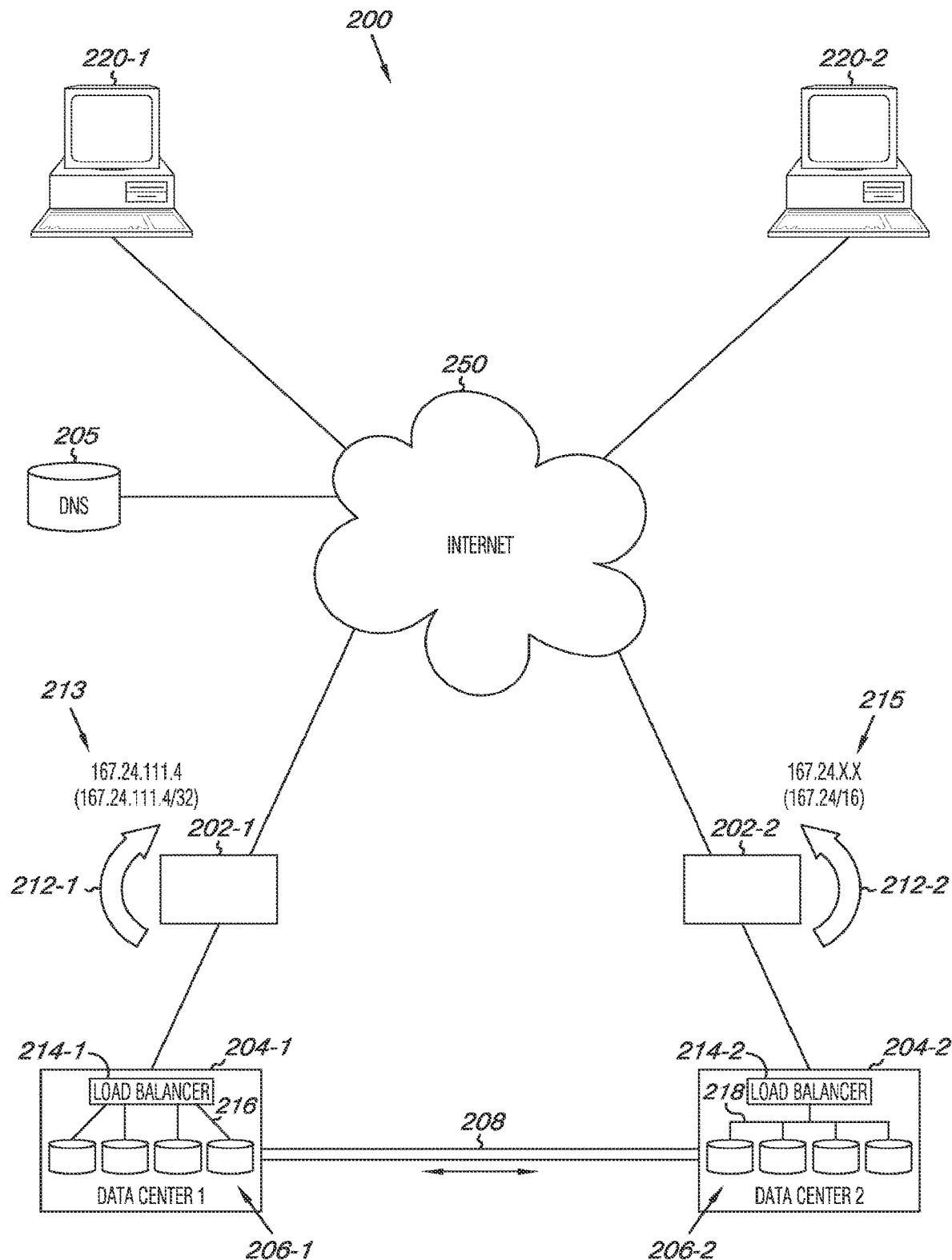
FIG. 2 illustrates a block diagram of a system for online brand continuity having two Internet access points according to one or more embodiments of the present disclosure.
Figure 3:
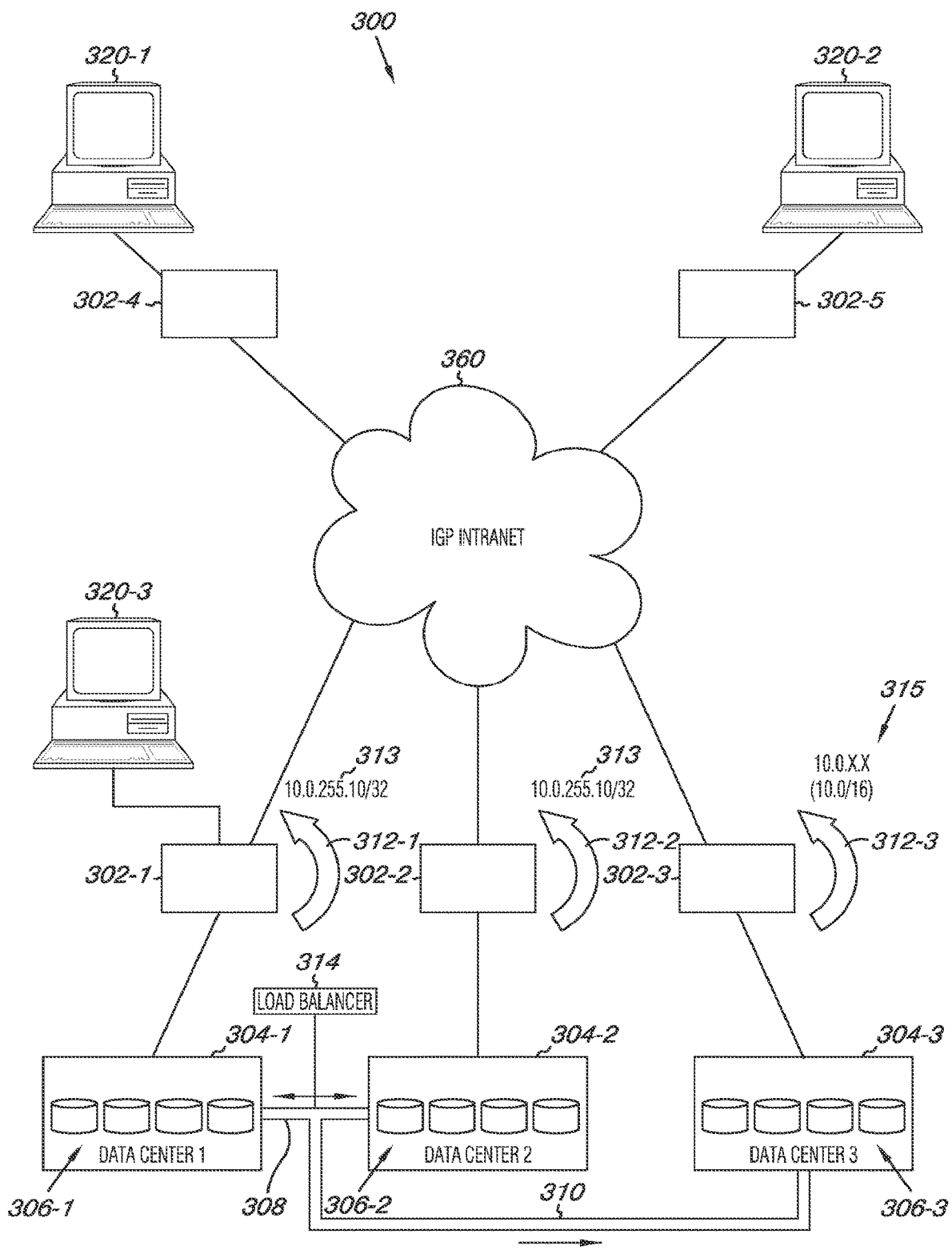
FIG. 3 illustrates a block diagram of a system for online brand continuity having three intranet access points according to one or more embodiments of the present disclosure.

In one or more embodiments, various components of the embodiments of systems for online brand continuity described herein, e.g., systems 100, 200, and 300 in FIGS. 1, 2, and 3, can involve the use of logic, e.g., application specific integrated circuits (ASICs), a processor, a controller, or the like. The processor may be interfaced with a memory configured to provide storage of a set of computer readable instructions in the form of software, firmware, and/or hardware that provides functionality. The interfaced memory may be implemented as a combination of volatile and non-volatile memory, such as dynamic random access memory ("DRAM"), EEPROM, flash memory, or the like.

FIG. 1 illustrates a block diagram of a system 100 for online brand continuity having three Internet access points 102-1, 102-2, and 102-3 according to one or more embodiments of the present disclosure. Each access point can be associated with a data center. For example, a first access point 102-1 can be associated with a first data center 104-1, a second access point 102-2 can be associated with a second data center 104-2, and a third access point 102-3 can be associated with a third data center 104-3. An organization operating multiple data centers can use one or more data centers, e.g., data centers 104-2 and 104-3, as failover data centers in case another data center, e.g., data center 104-1, loses some or all of its functionality such as a loss of functionality, of a network access point. Each data center can include a number of servers, e.g., servers 106-1 in data center 1, servers 106-2 in data center 2, and servers 106-3 in data center 3. The data centers can include various servers, such as web servers, application servers, file servers, email servers, print servers, database servers, etc. The data centers can also be associated with a load balancer and one or more routers, switches, hubs, and other networking devices.

In the embodiment illustrated in FIG. 1, a first specific network address 113-1 can be advertised 112-1 via a first access point 102-1; a second specific network address 113-2 can be advertised 112-2 via a second access point 102-2; and a less-specific address 115 can be advertised 112-3 via a third access point 102-3. Advertising a network address can include identifying a route for traffic having a particular destination address to upstream network components such as routers. That is, advertising a network address can instruct upstream routers to direct traffic for that address to, or through, the source of the advertisement. The specific network addresses, e.g., 167.24.21.4 and 167.24.111.4, can be advertised as single-host internet protocol (IP) addresses. The less-specific address, e.g., 167.24.X.X, can be advertised as a multi-host IP address. As illustrated in FIG. 1, the access points connect to the Internet 150. Accordingly, a border gateway routing protocol (BGP) can be used for routing network traffic through the access points. Using BGP, a specific address can be a preferred route to, e.g., appear shorter than, a less-specific address. For example, a router on the Internet directing traffic from client 120-1 to IP address 167.24.111.4 can select the route advertised 112-2 via access point 102-2, rather than the route advertised 112-3 via access point 102-3.

As illustrated in FIG. 1, the less-specific network address 115 can have a network prefix equal to at least a portion of the specific network addresses 113-1 and 113-2. For example, the first two octets of the single-host IP addresses (167.24) can be equal to the multi-host IP address (167.24/16). Accordingly, if either or both of the access points 102-1 and 102-2 fail to meet particular criteria, traffic directed to network addresses associated with the access points, e.g., specific network addresses 113-1 and 113-2, can be routed through the third access point 102-3 via which the less-specific network address 115 is advertised 112-3. That is, failure of an access point to meet particular criteria, e.g., access point 102-2, can result in, or result from a specific network address ceasing to be advertised via the access point. BGP routers in the Internet 150 can then route traffic addressed to the specific network address 113-2 through the access point 102-3 via which the less specific network address 115 is advertised.

A number of forms of data replication between data centers are described herein. According to one or more embodiments of the present disclosure, data replication can be accomplished in a manner to effectively implement the goals of atomicity, consistency, isolation, and durability (ACID). A goal of atomicity is to guarantee that each component of an operation is completed before the operation is validated. For example, if a particular data value is updated in a server in data center 1, atomic replication should guarantee that the particular data value is updated in a corresponding server in data center 2 before the update is validated, e.g., given an indication that the operation was completed successfully. A goal of consistency is to ensure that data and data organization follow a number of established parameters for a particular database. For example, if an operation changed a data value resulting in an invalid result, consistency would require that the data be returned to its original value rather than storing the invalid result. A goal of isolation is to prevent multiple operations from affecting a particular data value simultaneously. For example, an operation being executed on a data value in data center 1 should not be allowed to process simultaneously with an operation on the same data value in data center 2. A goal of durability is to ensure that a validated, e.g., successful, operation is properly recorded such that any data values affected by the operation are stored in their affected state, rather than a previous unaffected state. For example, if an operation to change a data value from "X" to "Y" successfully completes in data center 1, and data center 1 later experiences a loss of connectivity, for example, then the data value should be accessible as "Y" in data center 2, or in data center 1 after a recovery operation. Although the above examples refer to two data centers, the ACID principles can apply to systems including other numbers of data centers.

In the embodiment illustrated in FIG. 1, data center 1 and data center 2 are interconnected via an autonomous intranetwork connection 108. The autonomous intranetwork connection 108 can be a fiber optic connection, T-carrier connection, or another high-speed data connection. The autonomous intranet connection 108 can be a secure connection. In one or more embodiments, data, e.g., brand image application data, can be synchronously replicated between data center 1 and data center 2 via the autonomous intranetwork connection 108. In some instances, brand image application data can be atomically replicated between data center 1 and data center 2 such that a modified, or new, data value can be stored both in data center 1 and data center 2 before an indication of a successfully completed transaction is provided for an operation modifying or creating a particular data value. For example, network traffic from a client, e.g., client 120-1, could be routed to data center 1 and processed on one or more servers 106-1 therein. The client traffic could effect an operation that could add or modify a brand image application data value stored in one or more servers 106-1. The new or modified brand image application data value would be replicated and stored in one or more servers 106-2 in data center 2 before network traffic returned to the client 120-1 indicated that the requested operation completed successfully.

According to the embodiment illustrated in FIG. 1, the autonomous intranetwork connection 108 can be used to aid in splitting processing of brand image application data between data center 1 and data center 2. One or more application processing servers among the number of servers 106-1 in data center 1 and the number of servers 106-2 in data center 2 can split processing loads for embodiments where both data center 1 and data center 2 are maintained as active data centers. An active data center is one that receives and processes client traffic. For example, traffic from a client, e.g., client 120-1, routed to data center 1 could require multiple processing operations. The multiple processing operations could be performed entirely within data center 1, transferred entirely to data center 2 via autonomous intranetwork connection 108, or performed partially within data center 1 and partially within data center 2.

Another example of split processing applies to traffic from multiple clients, e.g., clients 120-1 and 120-2. Traffic from clients 120-1 and 120-2 may require multiple processing applications, and as such, traffic from each client can be split between data center 1 and data center 2 using the autonomous intranetwork connection 108 such that a first type of processing application is performed in data center 1 and a second type of processing application is performed in data center 2. For example, traffic using website application processing can be processed in data center 1, while traffic using file server processing can be processed in data center 2. For embodiments where data center 1 and data center 2 are maintained as active/standby data centers, processing can be split such that one data center is primary, e.g., the active data center, and the other data center is secondary, e.g., the standby data center.

Certain portions of brand image application data can be asynchronously replicated from data center 1 and data center 2 to a third data center 104-3 via a second autonomous intranetwork connection 110. The second autonomous intranetwork connection 110 can be a same type of connection as the autonomous intranetwork connection 108 between data center 1 and data center 2, or a different type. For example autonomous intranetwork connection 110 can be a fiber optic connection, T-carrier connection, or another high-speed data connection. An asynchronous replication of data is complete upon successful receipt of the data. That is, unlike synchronous replication wherein both sender and receiver must confirm the replication, asynchronous replication allows the sender to "fire and forget" the data to be replicated. Everything else being equal, asynchronous replication can be faster than synchronous replication. Although embodiments of the present disclosure are not limited to having particular limits on distances between data centers, data center 1 and data center 2 may be more proximate to each other than they are to data center 3, at least in part due to the generally faster speed of asynchronous replication of data over the second autonomous intranetwork connection 110.

Asynchronous replication of data via the second autonomous intranetwork connection 110 can allow for durable replication of data to data center 3. For example, after one or more servers 106-3 in data center 3 successfully receive an updated or new data value, the new data value will not revert to a prior state. In one or more embodiments data can be asynchronously replicated to data center 3 via the second autonomous intranet connection 110 after it has been synchronously replicated between data center 1 and data center 2 via autonomous intranet connection 108. In one or more embodiments data can be asynchronously replicated to data center 3 via the second autonomous intranetwork connection 110 from each of data center 1 and data center 2 without regard to whether synchronous replication has completed.

Certain data can be replicated at a database management system (DBMS) level operating in an operating system (OS)

layer. In one or more embodiments, certain portions of data, e.g., data associated with authentication and member access to a website, can be replicated from data centers 1 and 2 to data center 3 at the DBMS level. Accordingly, when access points 102-1 and 102-2 fail to meet particular criteria, traffic can be transitioned to through access point 102-3 automatically, e.g., without manual intervention. Providing online applications can involve the use of a significant amount of static data. Static data can include data that is not modifiable by a client and/or data that does not change frequently. Examples of such "static" data can include generic or high level information, financial articles, member information including login and password information. Although "static" data can be modified, it is referred to herein as static data because it can be always available to a client.

Dynamic data can include data that is supplied and/or modifiable by a client. Dynamic data can include data that is created for a particular client in association with a particular client session. Accordingly, a number of different database management systems can be used with different data types. Examples of relational DMBS include Microsoft's SQL Server, Oracle Database, and IBM's DB2. Embodiments are not limited to the use of any or all of these particular systems.

Servers, e.g., servers 106-1, can host a number of brand image applications. An organization can host one or more brand image applications in multiple data centers, e.g., data centers 104-1 and 104-2. In one or more embodiments of the present disclosure, a number of brand image applications can be made fully available to a client, e.g., client 120-1, via at least one of access points 102-1 and 102-2 when at least one of the access points is functional. A logon page, e.g., a "front door," to a number of brand image applications can be provided from any of data center 1, data center 2, and data center 3. Analogous to the description above, brand image application data can be synchronously replicated between data center 1 and data center 2. Accordingly, full availability of a brand image application can be maintained from either data center via an associated Internet access point. For example, the data centers illustrated in FIG. 1 can host a brand image application that is a website for an organization "www.organization.com." When a client, such as client 120-1, directs a web browser to that URL, a domain name system (DNS) server, e.g., DNS server 205 in FIG. 2, can resolve either of the specific addresses 113-1 or 113-2, when either is functional. As such, the website can be made fully available to the client via at least one of the Internet access points 102-1 and 102-2.

Analogous to the description above, brand image application data can be asynchronously replicated from data centers 1 and 2 to data center 3 via the second autonomous intranetwork connection 110. Accordingly, at least partial availability of one or more brand image applications is available to a client via Internet access point 112-3 when at least one of Internet access point 102-1 and Internet access point 102-2 fail to meet particular criteria. In one or more embodiments, partial availability of the brand image application is available via access point 102-3. When access points 102-1 and 102-2 fail to meet particular criteria, servers associated with access point 102-3, which are connected to storage frames, can provide access to the data. In such embodiments, full availability can be restored after brand image application data replication has been completed.

Other restoration methods can include failback, where brand image application processing and network traffic can be automatically, e.g., with no manual intervention, transitioned back to at least one of data center 1 and data center 2. Such failback can occur when a specific network address is advertised via at least one of access points 102-1 and 102-2, for example.

By way of example, and not by way of limitation, a brand image application can include a website. The website can be made at least partially available to a client, analogous to the description above, including at least a main webpage, a login page, and a webpage for providing certain static data. A website can have a membership basis, such that member clients, e.g., authorized clients, can have access to a number of portions of the website, e.g., web pages, to which non-member clients do not have access. When such a website is made at least partially available to clients according to one or more embodiments of the present disclosure, an inability of a non-member client to gain access to the website beyond a login page can conceal a failure of at least one of the first access point 102-1 and the second access point 102-2 to meet particular criteria to the non-member client. Accordingly, providing certain static data to a member client, e.g., via access point 102-3, when at least one of access points 102-1 and 102-2 have failed to meet particular criteria can conceal the one or more failures to meet particular criteria to the member client. For example, the member client could be provided with a main web page, a login page, and certain web pages containing static data generally not requiring replication. In the event a member client attempted to access certain dynamic data that had not been replicated to data center 3, the client can be provided with a web page based on static data indicating that the website is temporarily being serviced and will resume full functionality at a later time.

FIG. 2 illustrates a block diagram of a system 200 for online brand continuity having two Internet access points 202-1 and 202-2 according to one or more embodiments of the present disclosure. Each access point can be associated with a data center. For example, a first access point 202-1 can be associated with a first data center 204-1, and a second access point 202-2 can be associated with a second data center 204-2. An organization operating multiple data centers, e.g. data centers 204-1 and 204-2, can use a data center, e.g., data center 204-2, as failover data center in case another data center, e.g., data center 204-1, loses some or all of its functionality, such as a loss of functionality of a network access point 202-1. Each data center can include a number of servers, e.g., servers 206-1 in data center 1 and servers 206-2 in data center 2. The data centers can include various servers, such as web servers, application servers, file servers, email servers, print servers, database servers, etc. The data centers can also be associated with a load balancer, e.g., load balancers 214-1 and 214-2, and one or more routers, switches, hubs, and other networking devices.

Load balancers 214-1 and 214-2 can balance network traffic, e.g., from a number of clients, both within a particular data center, e.g., data center 204-1, and between a number of data centers, e.g., data centers 204-1 and 204-2. Load balancers can perform health checks on a number of servers 206-1 in a data center 204-1. In one or more embodiments, a load balancer can perform a health check on a number of servers to determine whether the servers are functional, e.g., whether traffic should continue to be routed to the servers. A network administrator, for example, can establish certain criteria under which information received from a health check can cause a load balancer to initiate a failover. Such information can be used by a load balancer to initiate a failover between data centers, for example, by causing a network address to cease to be advertised, as is described in more detail below. A load balancer can be connected to a number of servers in a number of topologies. For example, load balancer 214-1 is illustrated connected to a number of servers 206-1 in a star topology 216, while load balancer 214-2 is illustrated connected to a number of servers 206-2 in a bus topology 218. Other topologies are possible as will be understood by one of ordinary skill in the art. Embodiments are not limited to the particular examples illustrated in the embodiment of FIG. 2.

In the embodiment illustrated in FIG. 2, a specific network address 213 can be advertised 212-1 via a first access point 202-1 and a less-specific address 215 can be advertised 212-2 via a second access point 202-2. The specific network address, e.g., 167.24.111.4/32, can be advertised as single-host internet protocol (IP) addresses. The less-specific address, e.g., 167.24.X.X, can be advertised as a multi-host IP address (167.24/16). As illustrated in FIG. 2, the access points connect to the Internet 250. Accordingly a border gateway routing protocol (BGP) can be used for routing network traffic to and from the access points. Using BGP, a specific address can be a preferred route to, e.g., appear shorter than, a less-specific address. For example, a router on the Internet directing traffic from client 220-1 to IP address 167.24.111.4 can select the route advertised 212-1 via access point 202-1, rather than the route advertised 212-2 via access point 202-2.

As illustrated in FIG. 2, the less-specific network address 215 can have a network prefix equal to at least a portion of the specific network address 213. For example, the first two octets of the single-host IP addresses (167.24) can be equal to the multi-host IP address (167.24/16). Accordingly, if the access point 202-1 fails to meet particular criteria, traffic directed to network addresses associated with the access point, e.g., specific network addresses 213, can be routed through the second access point 202-2 via which the less-specific network address 215 is advertised 212-2. That is, failure of an access point to meet particular criteria, e.g., access point 202-1, can result in, or result from a specific network address ceasing to be advertised via the access point. BGP routers in the Internet 250 can then route traffic addressed to the specific network address 213-1 through the access point 202-2 via which the less specific network address 215 is advertised. Although the example IP addresses illustrated herein may appear in IPv4 form, embodiments are not so limited. Embodiments of the present disclosure can be practiced using IPv6 and other network protocols.

In the embodiment illustrated in FIG. 2, data center 1 and data center 2 can be interconnected via an autonomous intranetwork connection 208. In one or more embodiments, data, e.g., brand image application data, can be synchronously replicated between data center 1 and data center 2 via the autonomous intranetwork connection 208. In some instances, brand image application data can be atomically replicated between data center 1 and data center 2 such that a modified, or new, data value can be stored both in data center 1 and data center 2 before an indication of a successfully completed transaction is provided for an operation modifying or creating a particular data value.

Servers, e.g., servers 206-1, can host a number of brand image applications. An organization can host one or more brand image applications in multiple data centers, e.g., data centers 204-1 and 204-2. In one or more embodiments of the present disclosure, a number of brand image applications can be made fully available to a client, e.g., client 220-1, via the first access point 202-1 when the specific network address is advertised 212-1 via that point, e.g., when access point 202-1 is functional. Analogous to the description above, brand image application data can be synchronously replicated between data center 1 and data center 2. Accordingly, full availability of a brand image application can be maintained from either data center via an associated Internet access point.

According to one or more embodiments of the present disclosure, at least partial availability of one or more brand image applications can be provided to a client via the second access point 202-2 when the specific network address 213 ceases to be advertised 212-1 via the first access point 202-1. In such instances, traffic from a client, e.g., client 220-1, that was addressed to the specific network address 213 can be logically routed through the first Internet access point 202-1, and physically routed through the second Internet access point 202-2. When a client addresses traffic to the specific network address 213 after the first access point 202-1 has failed to meet particular criteria, such traffic can still be routed through the second access point 202-2 according to the less-specific address 215, regardless of whether the client has refreshed a cache associated with domain name system (DNS) server 205 resolution. That is, traffic may continue to be addressed to the specific network address 213. Such traffic can have separate logical and physical routes transparently to the client.

FIG. 3 illustrates a block diagram of a system 300 for online brand continuity having three intranet access points 302-1, 302-2, 302-3, 302-4, and 302-5 according to one or more embodiments of the present disclosure. A number of access points can be associated with a data center. For example, a first access point 302-1 can be associated with a first data center 304-1, a second access point 302-2 can be associated with a second data center 304-2, and a third access point 302-3 can be associated with a third data center 304-3. A number of access points can be associated with a client connection to the interior gateway protocol (IGP) intranet. For example, access point 302-4 can be associated with client 320-1 and access point 302-5 can be associated with client 320-2.

Each of the interconnections illustrated in FIG. 3 represents an IGP link, as the embodiment illustrated in FIG. 3 represents an autonomous network including an IGP intranet 360. That is, one organization, e.g., one company, can exercise topographic control over the network. Although the system 300 can be connected, e.g., via border gateway protocol (BGP) to the Internet, such a connection is not illustrated herein so as not to obfuscate embodiments of the present disclosure described with respect to FIG. 3. As such, clients, e.g., client 320-1, connect to the IGP intranet 360 via an intranet connection. Clients, such as client 320-1, can use computing devices connected to the IGP network 360, e.g., a computing device operated by an employee of the organization that exercises topographic control over the network. Embodiments are not limited to employee-clients; other client-types are possible.

One or more load balancers 314 can balance network traffic, e.g., from a number of clients. Traffic can be balanced both within a particular data center, e.g., data center 304-1, and between a number of data centers, e.g., data centers 304-1 and 304-2.

In the embodiment illustrated in FIG. 3, a specific network address 313 can be advertised 312-1 via a first access point 302-1. The specific network address can also be advertised 312-2 via a second access point 302-2. A less-specific address 315 can be advertised 312-3 via a third access point 302-3. The specific network address, e.g., 10.0.255.10/32, can be advertised as single-host internet protocol (IP) addresses. The less-specific address, e.g., 10.0.X.X, can be advertised as a multi-host IP address (10.0/16). At least a network prefix, e.g., 10.0., can be advertised 312-3 as the less-specific network address 315 such that traffic addressed to any host having the network prefix can be accepted via the third intranet access point 302-3. As illustrated in FIG. 3, the network prefix, e.g., 10.0., can be advertised as a portion of the specific network address 313, e.g., 10.0.255.10, via the first intranet access point 302-1 and the second intranet access point 302-2. Accordingly, traffic from a client that was previously routed to data center 1 can be routed to either data center 2 or data center 3 without refreshing DNS cache. That is, data center 2 is associated with the same network address as data center 1, therefore the address would not require updating. Likewise, data center 3 is associated with a less-specific address including a same network prefix as the address associated with data center 1. Traffic addressed to data center 1 can be routed to data center 3 without updating and/or changing the destination address.

Routers in system 300 can use a particular routing protocol, e.g., open shortest path first (OSPF), to select a network path for traffic between a client, e.g., client 320-1, and a data center, e.g., data center 306-1. In some embodiments, the network path selected by one or more routers for traffic from a client to a data center can be the topographically shortest route, e.g., the route which may provide the highest speed for traffic flow to/from the client, the fewest number of hops, and/or the lowest cost metric, depending on the particular routing configuration employed. Accordingly, when the first and second access points 302-1 and 302-2 are functional, traffic from a particular client can be routed through one of the access points using OSPF protocol.

In the embodiment illustrated in FIG. 3, data center 1 and data center 2 are interconnected via an autonomous intranetwork connection 308. Data, e.g., brand image application data, can be synchronously replicated between data center 1 and data center 2 via the autonomous intranetwork connection 308. Brand image application data can be asynchronously replicated from data center 1 and data center 2 to a third data center 304-3 via a second autonomous intranetwork connection 310. Synchronous and asynchronous replication of certain portions of brand image application data can use a particular data-layer protocol. Replication of brand image application data associated with client identification and login to a brand image application, e.g., a website, can occur at a higher layer, e.g., a DBMS layer. Although embodiments of the present disclosure are not limited to having particular limits on distances between data centers, data center 1 and data center 2 may be more proximate to each other than they are to data center 3, at least in part due to the generally faster speed of asynchronous replication of data over the second autonomous intranetwork connection 310.

Servers, e.g., servers 306-1, can host a number of brand image applications. An organization can host one or more brand image applications in multiple data centers. In one or more embodiments of the present disclosure, a number of brand image applications can be made fully available to a client, e.g., client 320-1, via at least one of the first access point 302-1 and second access point 302-2 when the specific network address 313 is advertised via either point, e.g., when either access point is functional. Analogous to the description above, brand image application data can be synchronously replicated between data center 1 and data center 2. Accordingly, full availability of a brand image application can be maintained from either data center via an associated intranet access point.

According to one or more embodiments of the present disclosure, at least partial availability of one or more brand image applications can be provided to a client via the third access point 302-3 when neither of the first access point 302-1 and second access point 302-2 is functional. For example, a member client can be provided with access to at least certain static portions of a number of brand image applications via the third access point 302-3. In the same example, a non-member client can be provided with access to certain public static portions of brand image applications via any functional access point. Accordingly, when the third access point 302-3 is functional and the first and second access points 302-1 and 302-2 are not functional, unavailability of brand image applications via the first and second access points 302-1 and 302-2 is concealed to the non-member client. When either of the first 302-1 and second 302-2 access points regain functionality, network traffic and processing of brand image application data can be automatically returned to at least one of data center 1 and data center 2. Such automatic "fallback" can occur without manual intervention.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer system, comprising:
   a first server hosting a first instance of an application within a first data center, the first server advertised via a specific network internet protocol (IP) address of the first data center;
   a second server hosting a second instance of the application within a second data center synchronously replicating with the first data center, the second server advertised via the specific network IP address of the first data center; and
   a third server hosting a third instance of the application within a third data center asynchronously replicating from the first data center, the second data center, or both, the third server advertised via a less-specific network IP address than the specific IP address of the first data center.

2. The computer system of claim 1, comprising a load balancer configured to balance network traffic between the first data center and the second data center when the application is accessed via the specific network IP address.

3. The computer system of claim 1, wherein the specific network IP address comprises a single-host IP address.

4. The computer system of claim 3, wherein the less-specific network IP address comprises a multi-host IP address.

5. The computer system of claim 1, wherein the less-specific network IP address is associated with the specific network IP address.

6. The computer system of claim 5, wherein the less-specific network IP address is less than an entirety of the specific network IP address.

7. The computer system of claim 6, wherein the less-specific network IP address comprises a network prefix of the specific network IP address.

8. The computer system of claim 1, comprising routing hardware, routing software, or both configured to:
   direct traffic addressed via the specific network IP address to the first server, the second server, or both; and
   direct traffic addressed to the less-specific network IP address to the third server.

9. The computer system of claim 8, wherein the routing hardware, the routing software, or both is configured to, upon issue with the first server and the second server, provide failover by directing the traffic addressed via the specific network IP address to the third server, without refreshing a domain name system (DNS) cache.

10. The computer system of claim 1, comprising:
    a first access point configured to advertise the first server via the specific network IP address;
    a second access point configured to advertise the second server via the specific network IP address; and
    a third access point configured to advertise the third server via the less-specific network IP address.

11. The computer system of claim 10, wherein advertisement of the specific network IP address ceases, due to failure of the first access point, the second access point, an operation health of the first server, an operation health of the second server, or any combination thereof.

12. The computer system of claim 10, wherein the first access point is coupled to the first data center via a first interior gateway protocol (IGP) link, the second access point is coupled to the second data center via a second IGP link, and the third access point is coupled to the third data center via a third IGP link.

13. The computer system of claim 1, wherein the first data center and the second data center a coupled via an autonomous intranetwork connection that facilitates the synchronous replicating.

14. A method, comprising:
    hosting, via a first server, a first instance of an application within a first data center, wherein the first server advertised via a specific network internet protocol (IP) address of the first data center;
    hosting, via a second server, a second instance of the application within a second data center synchronously replicating with the first data center, wherein the second server advertised via the specific network IP address of the first data center; and
    hosting, via a third server, a third instance of the application within a third data center asynchronously replicating from the first data center, the second data center, or both, wherein the third server advertised via a less-specific network IP address than the specific IP address of the first data center.

15. The method of claim 14, comprising:
    balancing, via a load balancer, network traffic between the first data center and the second data center when the application is accessed via the specific network IP address.

16. The method of claim 14, wherein the specific network IP address comprises a single-host IP address, and wherein the less-specific network IP address comprises a multi-host IP address.

17. The method of claim 14, wherein the less-specific network IP address is associated with the specific network IP address, and wherein the less-specific network IP address is less than an entirety of the specific network IP address.

18. The method of claim 17, wherein the less-specific network IP address comprises a network prefix of the specific network IP address.

19. The method of claim 14, comprising:
    upon issue with the first server and the second server, provide failover by directing traffic addressed via the specific network IP address to the third server, without refreshing a domain name system (DNS) cache.

20. The method of claim 14, comprising:
    advertising, via a first access point, the first server via the specific network IP address;
    advertising, via a second access point, the second server via the specific network IP address; and
    advertising, via a third access point, the third server via the less-specific network IP address.

* * * * *